United States Patent [19]

Kikuchi

[11] Patent Number: 5,175,676
[45] Date of Patent: Dec. 29, 1992

[54] IMPROVED SHORT-CIRCUIT PROTECTION FOR DC/AC POWER CONVERTERS

[75] Inventor: Hidehiko Kikuchi, Tokyo, Japan

[73] Assignee: Kabushiki Kaisha Toshiba, Kawasaki, Japan

[21] Appl. No.: 787,627

[22] Filed: Nov. 4, 1991

[30] Foreign Application Priority Data

Nov. 6, 1990 [JP] Japan .................................. 2-298848

[51] Int. Cl.⁵ .......................................... H02M 7/122
[52] U.S. Cl. ...................................... 363/58; 363/56; 363/136
[58] Field of Search ..................... 361/104; 363/17, 27, 363/56, 57, 58, 127, 128, 132, 136, 137

[56] References Cited

U.S. PATENT DOCUMENTS

| | | | |
|---|---|---|---|
| 4,488,200 | 12/1984 | Matsuzaki | 363/58 |
| 4,733,146 | 3/1988 | Hamby | 363/137 |
| 4,745,513 | 5/1988 | McMurray | 363/57 |
| 5,123,746 | 6/1992 | Okado | 363/56 |

Primary Examiner—William H. Beha, Jr.
Assistant Examiner—Jeffrey Sterrett
Attorney, Agent, or Firm—Oblon, Spivak, McClelland, Maier & Neustadt

[57] ABSTRACT

This invention consists of a power conversion device wherein a circuit comprising semiconductor power elements and fuses connected in series with these, and feedback diodes connected in antiparallel with said semiconductor power elements is connected as a bridge, the A.C. terminals of said bridge circuit are connected to an A.C. power source, and the D.C. terminals are connected to a D.C. power source provided with a capacitor, characterized in that said feedback diodes are connected in antiparallel with the series circuits of said semiconductor power elements and fuses.

By means of the layout described above, the fuses are prevented from melting when a D.C. short-circuit occurs, since the current that flows from the A.C. terminal to the D.C. power source on D.C. short-circuiting flows through a feedback diode or a bypass diode, and not to the fuses.

1 Claim, 2 Drawing Sheets

IMPROVED SHORT-CIRCUIT PROTECTION FOR DC/AC POWER CONVERTERS

BACKGROUND OF THE INVENTION

1. Field of the Invention

The present invention relates to protection of a power conversion device.

2. Description of the Related Art

It is known that a power conversion device may be constituted by a bridge connection of a circuit consisting of semiconductor power elements (for example thyristor, gate turn-off thyristor and so on) and feed back diodes connected in antiparallel with these semiconductor power elements. Fuses are connected in series to those power semiconductor elements in order to protect the power semiconductor elements from overcurrent.

FIG. 1 is a layout diagram of a conventional power conversion device 1. A circuit consisting of power semiconductor elements 2a, 2b, 2c, and 2d, and fuses 4a, 4b, 4c, and 4d respectively connected in series therewith and respective feedback diodes 3a, 3b, 3c, and 3d connected in antiparallel with these semiconductor power elements 2a, 2b, 2c and 3d is connected in a bridge arrangement. The A.C. terminals 5a, 5b of this bridge circuit are connected to an A.C. power source 9 through an A.C. circuit breaker 6. The D.C. terminals 8a and 8b are connected to a D.C. power source provided with a capacitor 10. The D.C. power source is shown only by a capacitor, but it could be connected for example to a D.C. circuit such as a rectification device that converts A.C. to D.C.

In the power conversion device 1 as shown in FIG. 1, D.C. power can be converted into A.C. power by repetition of the following operation: semiconductor power elements 2a and 2d are turned ON, then after turning semiconductor power elements 2a and 2d OFF, semiconductor power elements 2b and 2c are turned ON, and then after turning semiconductor power elements 2b and 2c OFF, semiconductor power elements 2a and 2d are turned ON. If, during the operation described above, for example semiconductor power elements 2b and 2d are simultaneously turned ON due to a malfunction of the semiconductor power elements or to a failure of commutation etc., the discharge current from capacitor 10 becomes a short-circuit current flowing as shown by the broken line in FIG. 1. Fuses 4a-4d are provided to protect semiconductor power elements 2a-2d from such a short-circuit current.

As described above, apart from malfunctions in which the semiconductor power elements constituting the upper side are simultaneously turned ON, D.C. short-circuiting can occur, such as short-circuiting of capacitor 10, even when the semiconductor power elements are functioning normally. In such a case, if the A.C. side terminal 5a is positive and the A.C. side terminal 5b is negative, the short-circuit current flows by the path indicated by the continuous line in FIG. 1.

In contrast to this, if the A.C. side terminal 5a is negative and the A.C. side terminal 5b is positive, the short-circuit current flows through fuses 4b and 4c.

Fuses 4a-4d are provided with the object of protecting semiconductor power element 2a-2d from overcurrent, so they have a high-speed melting characteristic, so that the fuses melt before A.C. circuit breaker 6 opens (a time of about three cycles is required for A.C. circuit breaker 6 to open). Consequently, when D.C. short-circuiting other than a failure of commutation occurs, even though the short-circuit current doesn't flow through the power semiconductor elements, the power conversion device must be temporarily stopped in order for the fuses to be changed, because the fuses are melted by the short-circuit current.

SUMMARY OF THE INVENTION

The object of this invention is therefore to provide a power conversion device wherein the fuses are not melted and thus need not be changed when such D.C. short-circuiting as described above occurs.

In order to achieve this object, this invention comprises a power conversion device wherein a circuit comprising semiconductor power elements and fuses connected in series with these, and feedback diodes connected in antiparallel with said semiconductor power elements is connected as a bridge, the A.C. terminals of said bridge circuit are connected to an A.C. power source, and the D.C. terminals are connected to a D.C. power source provided with a capacitor, characterized in that said feedback diodes are connected in antiparallel with the series circuits of said semiconductor power elements and fuses.

By means of the layout described above, the fuses are prevented from being melted when D.C. short-circuiting occurs, since the current that flows from the A.C. terminal to the D.C. power source on D.C. short-circuiting flows through a feedback diode or a bypass diode, not to the fuses.

DESCRIPTION OF THE PREFERRED EMBODIMENT

This invention is described in detail below with reference to the layout diagram of FIG. 2.

Figure 1:
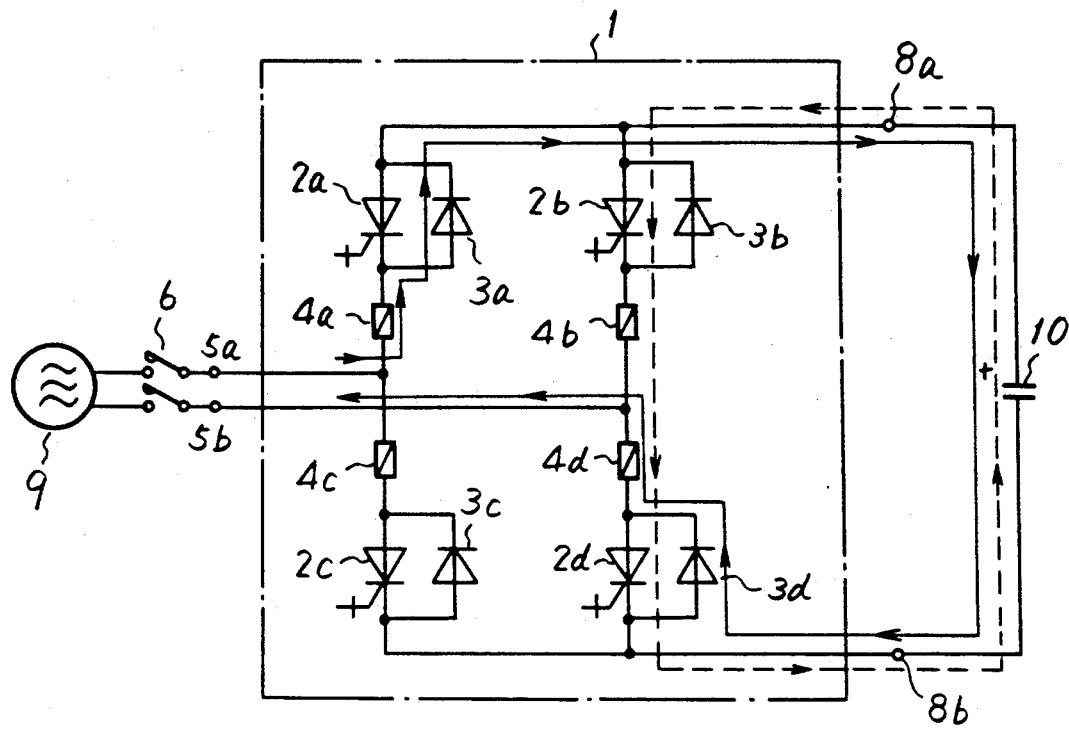
FIG. 1 is a layout diagram showing a conventional power conversion device.
Figure 2:
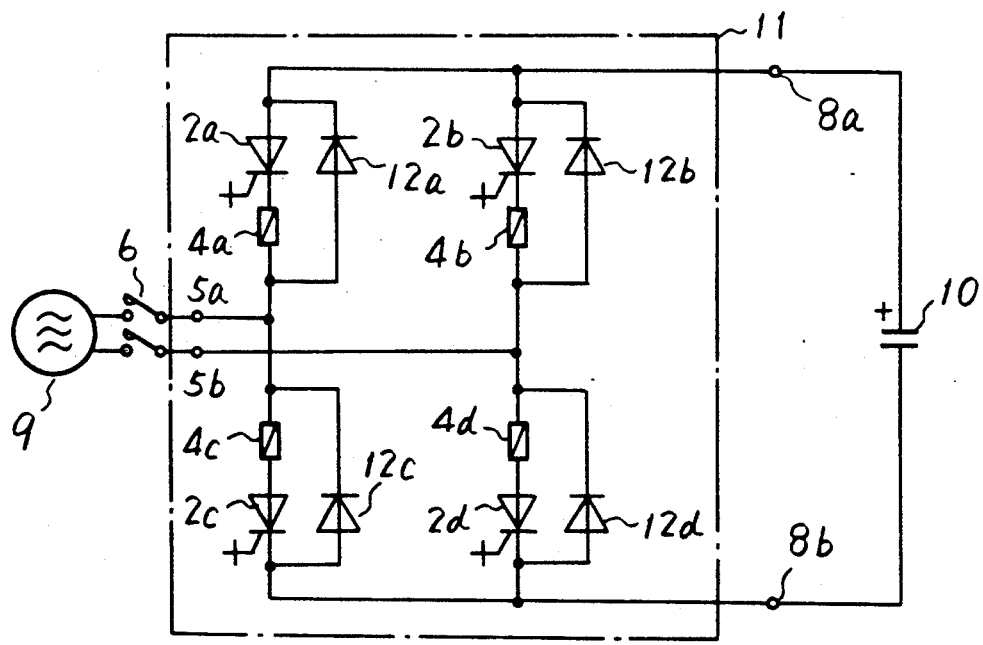
FIG. 2 is a layout diagram of a power conversion device of this invention.

FIG. 2 shows a power conversion device based on this invention.

A circuit consisting of power semiconductor elements 2a, 2b, 2c, and 2d, fuses 4a, 4b, 4c, and 4d respectively connected in series therewith and respective feedback diodes 12a, 12b, 12c, and 12d connected in antiparallel with these series circuits is connected in a bridge arrangement, the A.C. terminals 5a, 5b of this bridge circuit being connected to an A.C. power source through an A.C. circuit breaker while its D.C. terminals 8a and 8b are connected to a D.C. power source provided with a capacitor 10.

In a power conversion device constructed as above, if for example short-circuiting of capacitor 10 occurs, if the potential of the A.C. side terminal 5a is positive and that of the A.C. side terminal 5b is negative, the short-circuit current flows by the path A.C. terminal 5a → feedback diode 12a → capacitor 10 → feedback diode 12d → A.C. terminal 5b. Or if the potential of the A.C. side terminal 5a is negative and that of the A.C. side terminal 5b is positive, the short-circuit current flows by the path A.C. terminals 5b → feedback diode 12b → capacitor 10 → feedback diode 12c → A.C. terminal 5a.

Thus since the short-circuit current does not flow to fuses 4a–4d, the fuses 4a–4d cannot be melted.

This invention also protects against other types of short-circuits. For example if semiconductor power elements 2b and 2d are simultaneously turned ON due to a failure of commutation, the discharge current from capacitor 10 becomes a short-circuit current.

As soon as short-circuit current from capacitor 10 flows to fuses 4a and 4c, fuses 4a and 4c melt and semiconductor power elements 2a and 2c are protected from overcurrent.

Although, as described above, the short-circuit current that is produced when there is a short-current in the D.C. power supply does not flow to the fuses, the short-circuit current is still cut off by opening of the A.C. circuit breaker 6, since the short-circuit current flows through A.C. circuit breaker 6.

Figure 3:
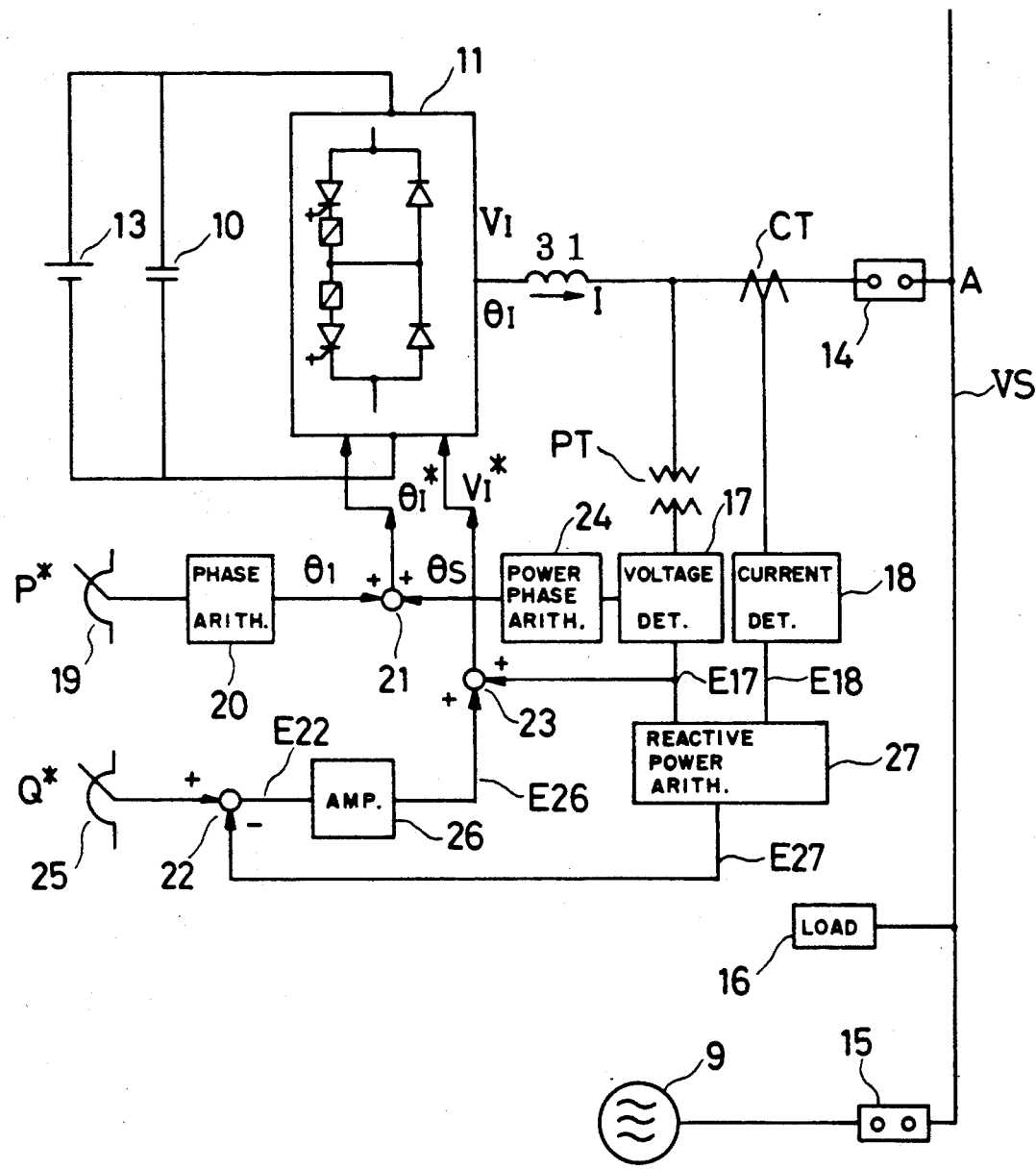
FIG. 3 is a layout diagram illustrating an embodiment of this invention.

FIG. 3 shows an inverter apparatus for system interconnection which has a power conversion device based on this invention.

A system for converting D.C. power, such as a solar cell or a fuel cell, into A.C. power using an inverter and then connecting the converted power to a power source system through a coupling reactor or a transformer has become popular in view of effective use of energy.

FIG. 3 is a block diagram showing an embodiment of the present invention. In FIG. 3, reference numeral 13 denotes a cell (D.C. power source); 11 is a PWM inverter; 31 is, a coupling reactor having a value X; 14 and 15 are A.C. circuit breakers; 9 is a power source; 16 is a load; 17 is a voltage detector; 18 is a current detector; 19 is an active power setter; 20 is a phase arithmetic operator; 21, 22, and 23 are adders; 24 is a power source phase arithmetic operator; 25 is a reactive power setter; 26 is an amplifier; 27 is a reactive power arithmetic operator; PT are potential transformers; and CT are a current transformer.

In the arrangement of FIG. 3, active power reference P* is supplied from active power setter 19. Phase arithmetic operator 20 operates phase angle $\theta I = \tan^{-1}(X \cdot I/Vs)$ defined by system voltage Vs and X·I corresponding to a voltage drop across coupling reactor 31 for active current I. When $\theta I$ is small, $\theta I \approx X \cdot I/Vs$. Since X and Vs are almost constant, a phase proportional to active current I can be supplied as $\theta I$. Phase $\theta I$ and phase $\theta s$ of the system voltage are added by adder 21, and the sum phase becomes output phase reference $\theta I^*$ of the PWM inverter 11.

Reactive power reference Q* is supplied from reactive power setter 25. Reactive power E27 operated by reactive power arithmetic operator 27 based on output E17 from voltage detector 17 and output E8 from current detector 18 is subtracted from value Q* to obtain deviation E22, and deviation E22 is amplified by amplifier 26. Amplified value E26 and output E17 representing the magnitude of system voltage Vs are added by adder 23 to determine the magnitude of output voltage reference VI* of the PWM inverter 11. A means for changing the magnitude of inverter output voltage VI can be realized by changing a pulse width when inverter 2 is pulse-width modulation (PWM) controlled.

The above described arrangement can provide an inverter apparatus for system interconnection which is able to control both activepower and reactive power.

The arrangement of the PWM inverter 11 is same as the arrangement of the power conversion device in FIG. 2.

When D.C. short-circuiting occurs in the D.C. power source which has the cell 13 and capacitor 10, if short-circuit current from A.C. power source 5 flows through the diodes, the fuses do not melt.

As described above, with this invention, even if a D.C. short-circuiting incident occurs on the D.C. power source side, the short-circuit current does not flow through the fuses, so the short-circuit current is cut off by the A.C. circuit breaker without melting the fuses. Thus, this invention eliminates the need to change the fuses after resetting when a short-circuit condition has occurred.

What is claimed is:

1. A power conversion device comprising:
   semiconductor power elements;
   fuses, connected in series with the semiconductor power elements;
   a bridge circuit, constituted by a bridge connection of a series circuit consisting of the semiconductor power elements and the fuses, the A.C. terminals of which are connected to an A.C. power source, and the D.C. terminals of which are connected to a D.C. power source provided with a capacitor;
   feed back diodes, each of which are connected in antiparallel with the series circuits of the semiconductor power elements and fuses.

* * * * *